US005539177A

United States Patent [19]

Okuya et al.

[11] Patent Number: 5,539,177
[45] Date of Patent: Jul. 23, 1996

[54] METHOD OF AND APPARATUS FOR OVERLAP WELDING OF THE INNER SURFACE OF AN ELBOW PIPE

[75] Inventors: Masaru Okuya; Tetsuo Yamada; Fujio Kageyama; Yuji Yutaka, all of Takasago; Yukio Hase; Yoshiteru Kushida, both of Kobe, all of Japan

[73] Assignee: Kabushiki Kaisha Kobe Seiko Sho, Kobe, Japan

[21] Appl. No.: 329,843

[22] Filed: Oct. 27, 1994

[30] Foreign Application Priority Data

Oct. 27, 1993 [JP] Japan ................................. 5-268714
Oct. 27, 1993 [JP] Japan ................................. 5-268715

[51] Int. Cl.⁶ ................................................. B23K 9/04
[52] U.S. Cl. ..................... 219/61; 219/76.14; 219/125.11
[58] Field of Search ............................ 219/76.14, 125.1, 219/125.11, 61; 228/48

[56] References Cited

U.S. PATENT DOCUMENTS

| | | | |
|---|---|---|---|
| 3,156,968 | 11/1964 | White, Jr. ............................. | 219/76.14 |
| 3,568,029 | 3/1971 | Bollinger ............................. | 219/125.1 |
| 4,165,245 | 8/1979 | Ludwig ................................. | 219/76.1 |
| 4,253,006 | 2/1981 | Ludwig ................................. | 219/125.1 |
| 4,514,443 | 4/1985 | Kostecki ............................... | 219/61 |
| 4,577,795 | 3/1986 | Forner et al. ......................... | 228/48 |
| 5,205,469 | 4/1993 | Capitanescu ......................... | 219/125.1 |

*Primary Examiner*—Clifford C. Shaw
*Attorney, Agent, or Firm*—Oblon, Spivak, McClelland, Maier & Neustadt

[57] ABSTRACT

In a method for overlap welding the inner surface of an elbow pipe, the elbow pipe is first divided axially into several pieces. These pieces are then stacked such that the inner arc of any piece is continuous with the outer arc of neighboring piece(s) to form an elbow piece stack. The inner surface of this stack may then be automatically overlap welded to a high uniformity of thickness using a relatively simple welding method. By fixing a short straight end tube to each end of the elbow piece stack it becomes possible using a relatively simple welding method to automatically overlap weld the entire surface area of the inner surface of the elbow piece stack continuously and to a high uniformity of thickness thus further improving productivity and quality of finish. The welded stack of elbow pieces is then dismantled and the elbow pipe is reassembled from the separate pieces.

8 Claims, 8 Drawing Sheets

METHOD OF AND APPARATUS FOR OVERLAP WELDING OF THE INNER SURFACE OF AN ELBOW PIPE

FIELD OF THE INVENTION

This invention relates to a method of and apparatus for overlap welding of a corrosion resistant material on the inner surface of an elbow pipe such as those used in pressure vessels.

DESCRIPTION OF THE PRIOR ART

In the prior art methods of inner surface overlap welding employing the conventional type of automatically welding machines, there was a problem that there were many areas that the welding torch could not reach. As a result it became common practice to perform the welding by hand with the consequent decrease in productivity.

In an effort to resolve these problems, a method of inner surface welding was devised in which the elbow pipe was first split into several pieces in the axial direction, and then the inner surface of each of these pieces were then individually overlap welded by the use of an automatic welder. Finally the build up welded pieces were then joined together by welding. However this prior art method has the following problems: (a) each piece had to be individually welded and thus the productivity was poor because of the time required to prepare each piece and to change between pieces; and (b) in order to automatically weld the entire surface of each piece, a rather complicated method of welding was employed such as that described in Japanese Patent Publication Showa 60-10832. Even using such a complicated method the resulting overlap layer on the inner surface of each piece was not of high quality in that the uniformity in thickness was poor.

It is thus an object of this invention to provide an improved method of overlap welding the inner surface of an elbow pipe, and apparatus for effecting such method.

SUMMARY OF THE INVENTION

According to the method of this invention, the elbow piece is split into several pieces in the axial direction and these pieces are then stacked on top of each other such that the inner arc of any piece is continuous with the outer arc of neighboring piece(s) to form an elbow piece stack. By mounting the elbow pieces in this way it becomes possible to automatically overlap weld the majority of the inner surface area of the above assembled elbow piece stack using a relatively simple overlap welding method. Since the inner surface of all the elbow pipe pieces can be overlap welded at one time, the productivity is significantly increased. After welding, the elbow piece stack is dismantled and the elbow pipe is reassembled from the separate pieces.

In a preferred embodiment, a short straight end tube is fixed to each end of the elbow piece stack to form a work piece. By fixing such end tubes to the elbow piece stack, it becomes possible to weld the entire surface area of the inner surface of the elbow piece stack (i.e. the inner surface of all the elbow pieces) using a relatively simple overlap welding method. It is thus possible to even further improve the productivity of the overlap welding operation.

In a preferred embodiment, the welding process comprises displacing a welding torch, mounted for rotation in a plane perpendicular to the longitudinal axis of the work piece (or elbow piece stack) (longitudinal axis refers to the straight line joining the points of inflection of the center axis of the elbow piece stack) and directed towards the inner surface of the work piece (or elbow piece stack), to follow the center axis of the work piece (or elbow piece stack) and rotating said welding torch in a plane perpendicular to the longitudinal axis of the work piece (or elbow piece stack). The welding finish achieved using this type of welding method is of a particularly high quality with regards to uniformity of thickness.

In the case when the elbow piece has been divided into a relatively large number of relatively small pieces, the elbow piece stack assembled in the way described above has a center axis of relatively shallow amplitude (undulation) and it is also possible to weld the inner surface of the work piece (or elbow piece stack) by displacing a welding torch, mounted for rotation in a plane perpendicular to the longitudinal axis of the work piece (or elbow piece stack) and directed towards the inner surface of the work piece (or elbow piece stack), to follow the longitudinal axis of the work piece (or elbow piece stack) and rotating said torch about the longitudinal axis of the work piece (or elbow piece stack).

The above described overlap welding method can also be applied to individual pieces. In this case, short straight end tubes are fixed to each end of the individual piece and overlap welding of the type described above is performed. Although the productivity is not as good as in the case when all the pieces are arranged to form an elbow piece stack before welding, since the entire surface area of the inner surface of the piece can be automatically overlap welded to produce a finish of high uniformity without the need for complicated control, it too represents a significant improvement over the prior art method.

The apparatus for effecting the overlap welding method according to the present invention comprises: support means for supporting the elbow piece stack (or work piece-work piece refers to the assembly comprising the elbow piece stack with a straight end tube attached to each end thereof); welding torch mounted for rotation in a plane perpendicular to the longitudinal axis of said elbow piece stack (or work piece) and for displacement in a direction parallel to the longitudinal axis of said elbow piece stack (or work piece); torch displacing means for displacing the torch in a direction parallel to the longitudinal axis of the elbow piece stack (or work piece); torch rotating means for rotating said welding torch in a plane perpendicular to the longitudinal axis of the elbow piece stack (or work piece); and control means for controlling said torch rotating means and said torch displacing means.

In a preferred embodiment of the apparatus according to this invention, the welding torch is also mounted for displacement in a direction perpendicular to the longitudinal axis of the elbow piece stack (or work piece) and the apparatus further comprises copy means for making the welding torch follow the center axis of the elbow piece stack (or work piece),. This copy means comprises a copy gauge having a surface parallel to the center axis of the elbow piece stack (or work piece); detection means for detecting the position of the copy gauge as the torch moves in a direction parallel to the longitudinal axis of the elbow piece stack (or work piece); and second torch displacing means for displacing said welding torch in a direction perpendicular to the longitudinal axis of said elbow piece stack (or work piece) in accordance with signals from said detection means.

DETAILED DESCRIPTION OF THE EMBODIMENTS

The embodiment of this invention shall be described with reference to the Figures.

In this embodiment, the case where a 90° elbow pipe is divided into 3 at an angle of 30°, and the 30° angle pieces P . . . are then subjected to inner surface overlap welding is taken as an example.

Figure 1:
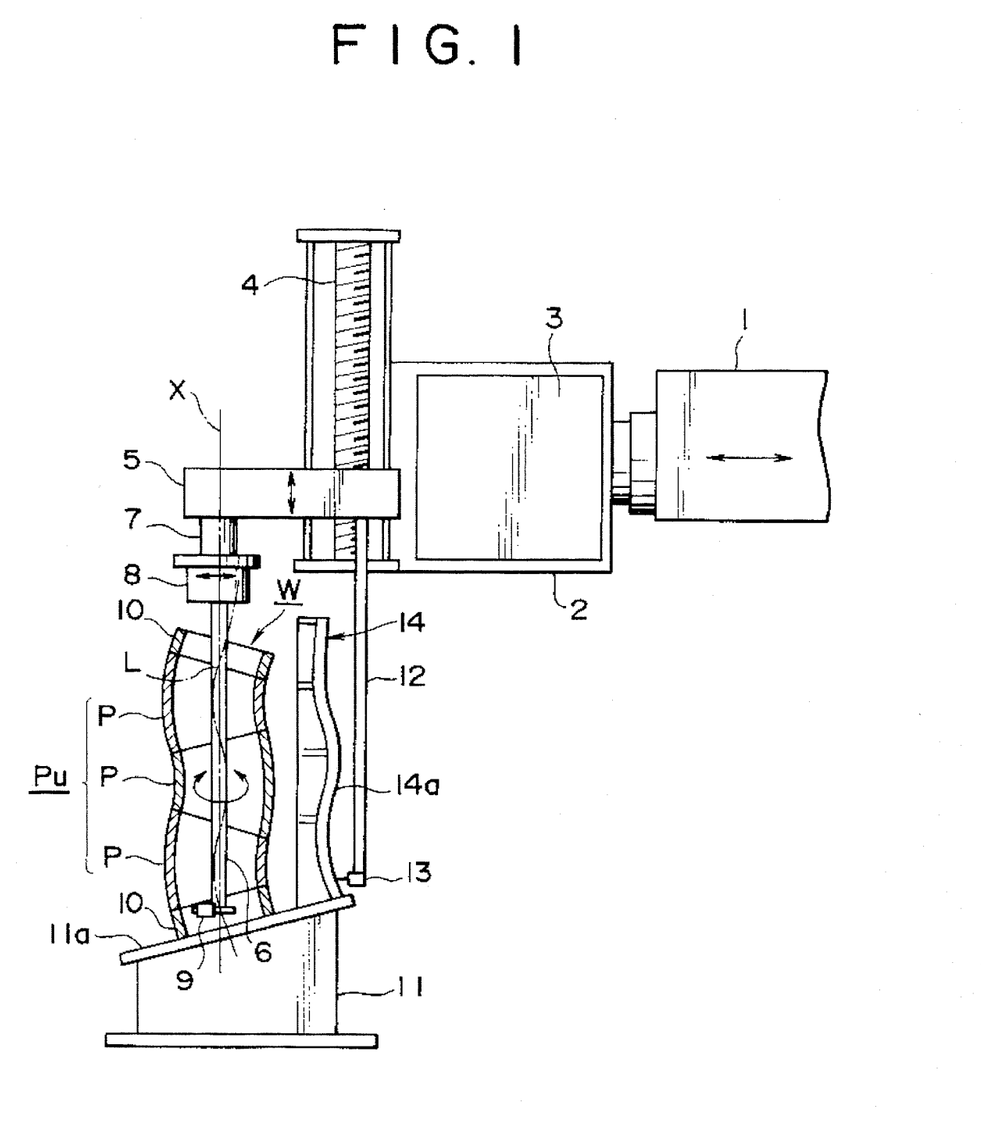
FIG. 1 is schematic cross-sectional diagram of the whole structure of the welding device of one embodiment of this invention.
Figure 2:
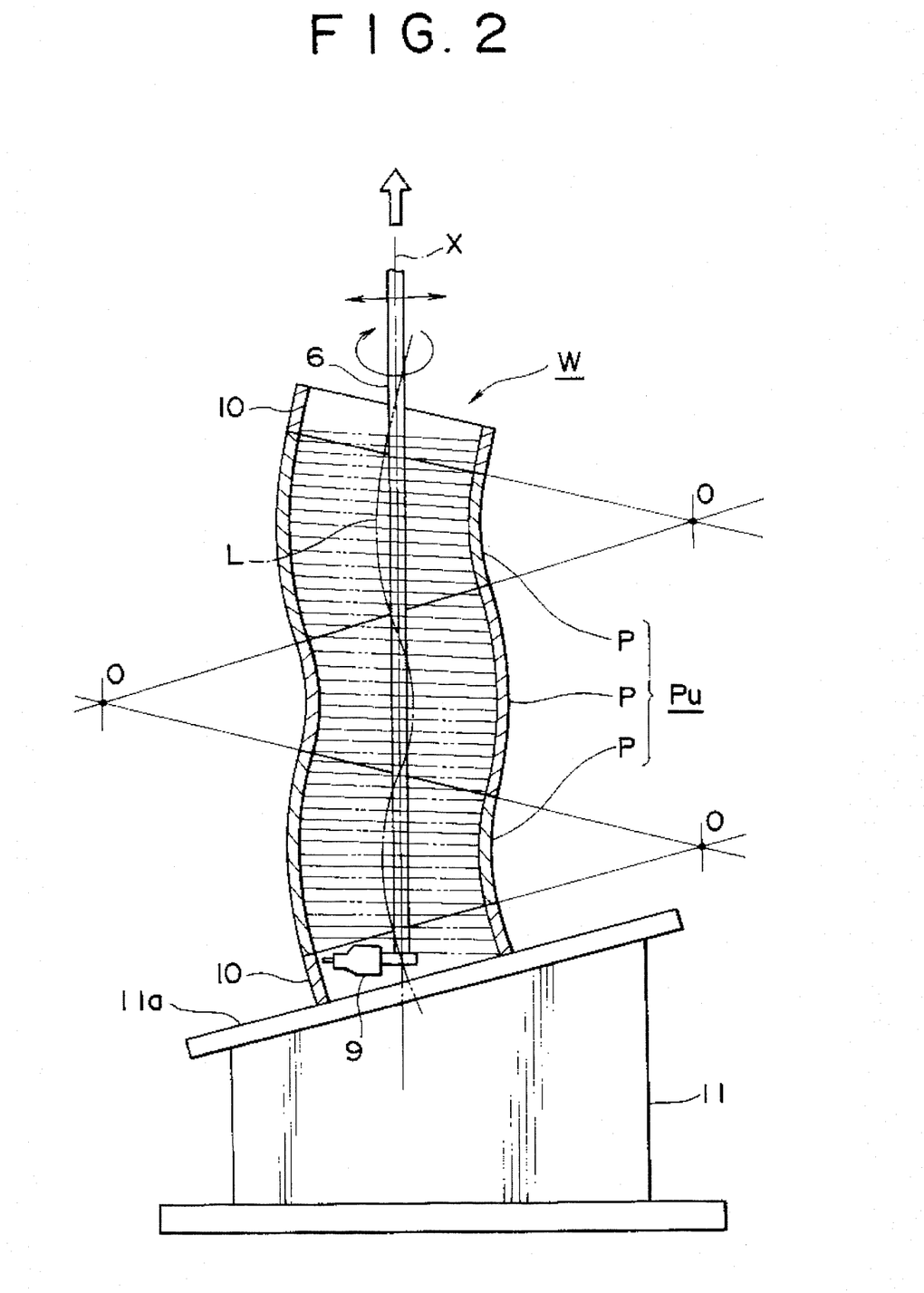
FIG. 2 is an enlarged view of the work piece and welding torch of FIG. 1.

In FIGS. 1 and 2, boom 1 is contracted and extended by the action of a hydraulic cylinder (not shown), frame 2 is fixed to the end of boom 1, and controller 3 (control means) is mounted on frame 2.

Vertical screw shaft 4 is mounted on frame 2, and head 5 is screw fitted onto vertical screw shaft 4. Head 5 is moved up and down in a vertical direction through the rotation of vertical screw shaft 4 by a motor (not shown) such as a hydraulic motor or an electric motor etc..

Torch pipe 6 is suspended from head 5 via rotational head 7 (driven for rotation by a motor (not shown)), and an AVC slider mechanism 8 of a TIG (Tungsten Inert Gas) welder. Welding torch 9 is installed on the bottom tip of torch pipe 6.

Thus, welding torch 9 is supported for (a) rotation about the axis of torch pipe 6 (vertical axis X) through the action of rotation head 7;

(b) displacement up and down along vertical axis X through the up and down movement of head 5; and (c) displacement in a horizontal direction through the contractions and extensions of boom 1.

The above rotation and displacements are all controlled by controller 3.

Furthermore, in torch pipe 6, there are located a shield gas pipe, a water pipe and a filler metal pipe all running to welding torch 9. These kinds of pipes are all well-known in the art and are therefore not shown in detail.

Figure 3:
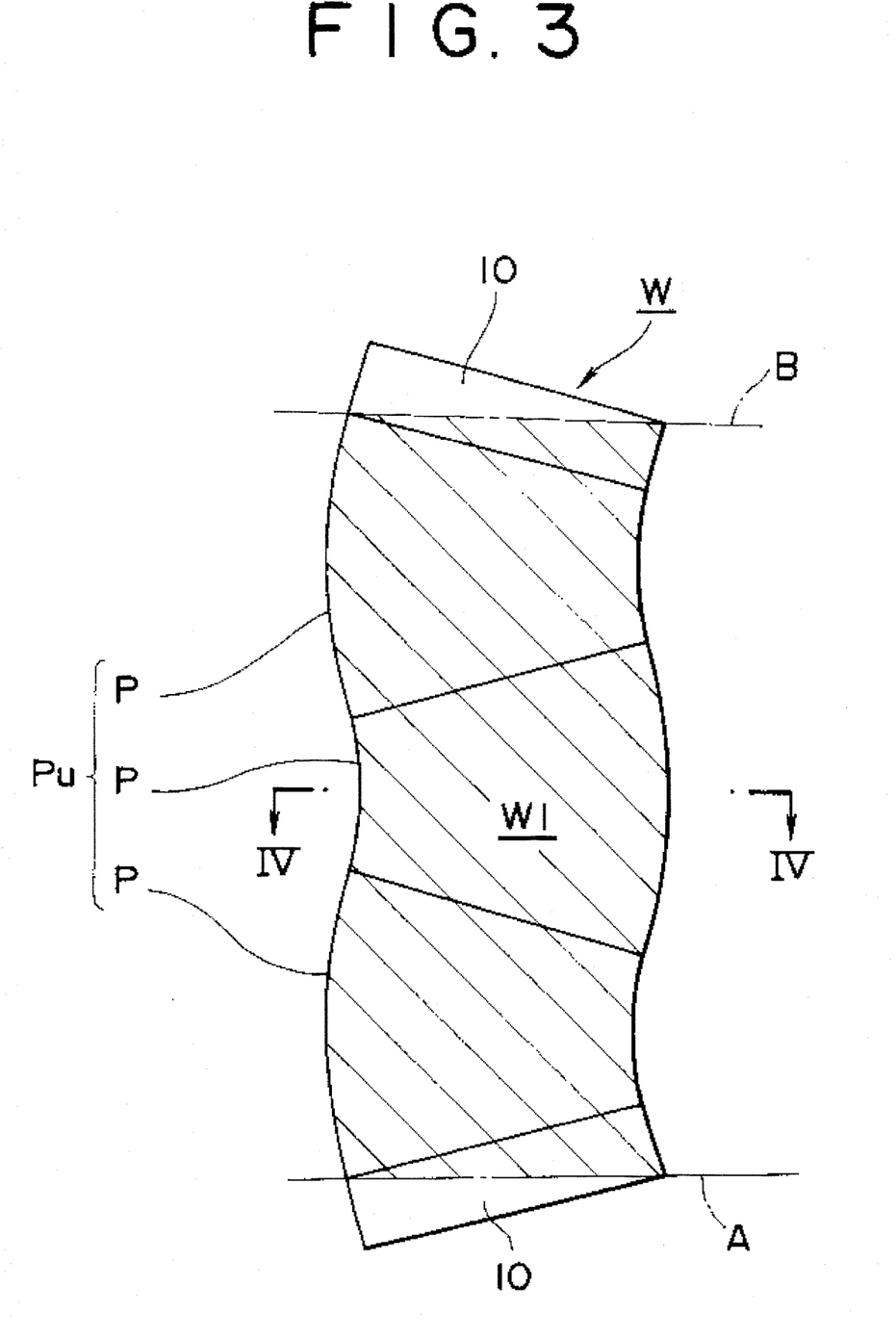
FIG. 3 is an enlarged cross-sectional diagram of the work piece to be subjected to inner surface overlap welding.

Then, as shown in FIG. 3, in preparation for inner surface overlap welding, the elbow pieces P, are stacked on top of each other in a way such that the inner arc of any piece is continuous with the outer arc of neighboring piece(s), and the resulting stack is temporarily welded together.

Then a straight tube shaped short end tube 10, 10 is temporarily welded to each end of the stack Pu made up of elbow pieces P, to form work piece, W and this work piece is mounted vertically on stand 11.

The support face 11a of stand 11 is inclined at an angle of 15° (exactly half of division angle, 30°), such that when the work piece is mounted on stand 11, the longitudinal axis of the work piece is a vertical line following the plumb line.

As shown in FIG. 3, in this position, it is the part of the work piece W1 located in between horizontal lines A and B which respectively run through each extreme end of the elbow piece stack, Pu (as shown in FIG. 3, this is the part consisting of all of elbow piece stack, Pu and part of end tubes 10 and hereafter it shall be called work piece welding region, W1), which is subject to inner surface overlap welding.

Figure 5:
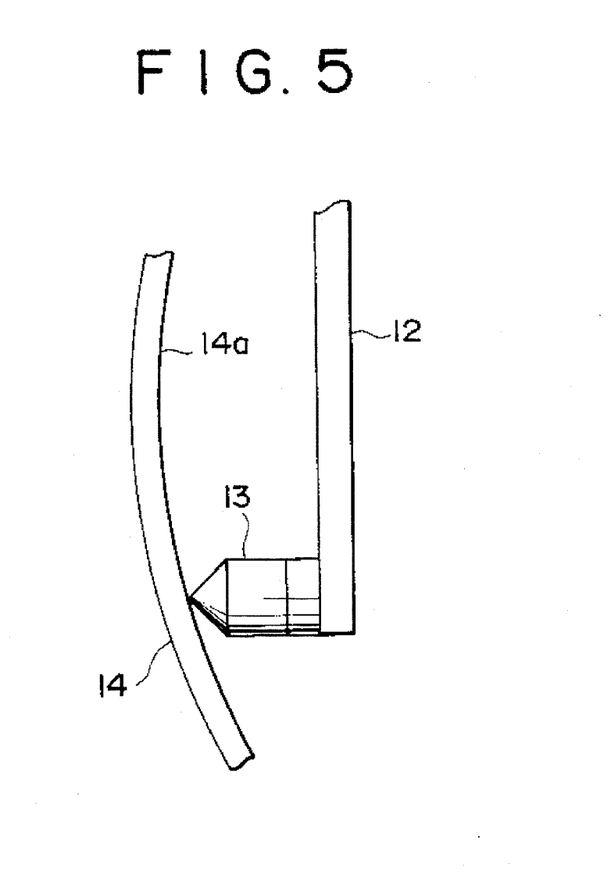
FIG. 5 is an enlarged view of the profile gauge of FIG. 1.

In addition, as shown in FIGS. 1 and 5, an arm 12 is suspended from head 5 and a limit switch 13 as detection means is fixed to this arm 12. This limit switch 13, while contacting copy gauge 14 having a surface parallel to the work piece center axis L, moves up and down with head 5. Limit switch 13 sends an on or off signal to controller 3 in accordance with the horizontal position of profile surface 14a.

Figure 6:
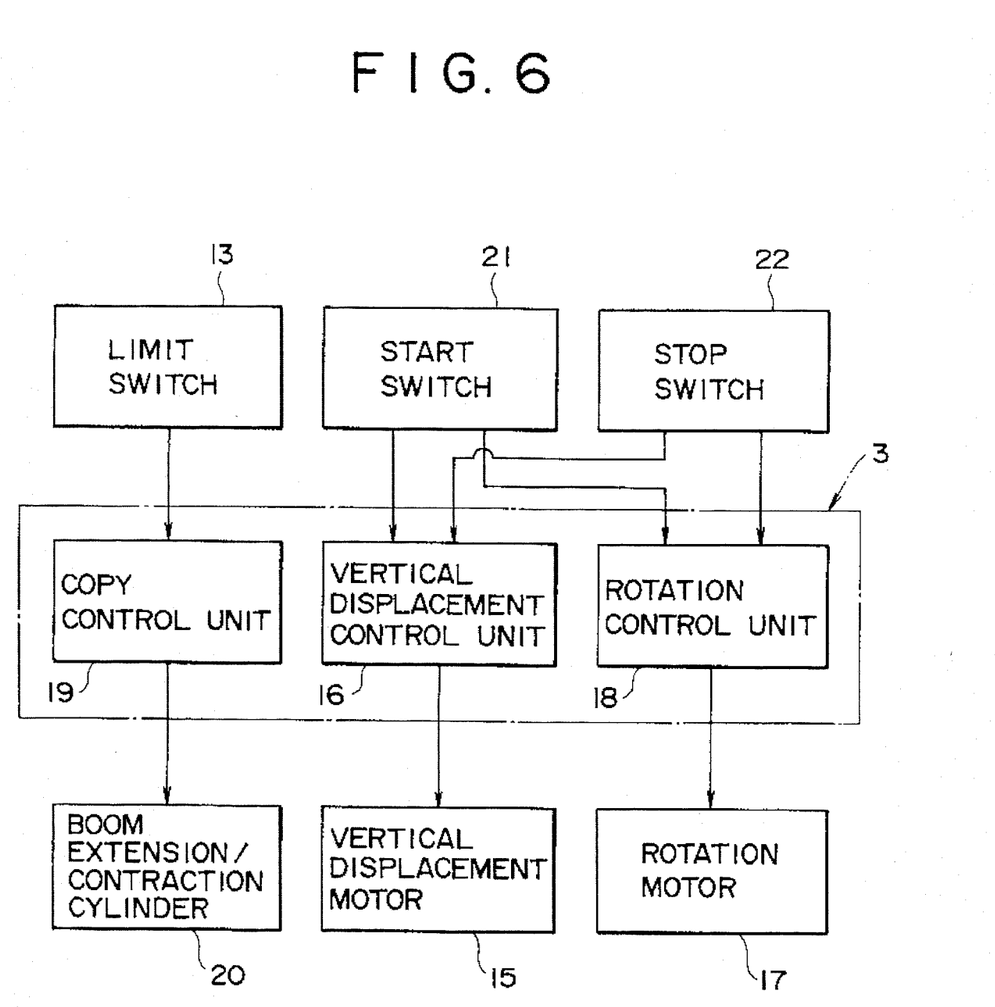
FIG. 6 is a block diagram relating to the control of the welding device.

Controller 3 is comprised of vertical movement control means 16 for controlling the vertical movement of head 5 (through motor 15); rotational control means 18 for controlling the rotational movement of rotational head 7 (through motor 17) and copy control means 19. Copy control means 19 controls the contraction/extension movement of boom 1 (through cylinder 20) in accordance with the above described limit switch signal.

Thus, the vertical shaft holding the welding torch is moved in the left or right direction of FIG. 1 (or FIG. 2) as the welding torch is moved vertically, to thereby cope with the horizontal changes in position of the work piece center accompanying any vertical displacement. The vertical axis X is thus maintained at a position matching the center of the work piece for each vertical position within the welding region W1. As described above, the welding torch is rotatable in a plane perpendicular to vertical axis X. In more general terms, the rotation occurs in a plane perpendicular to the longitudinal axis of the work piece. Longitudinal axis refers to the straight line axis formed by joining the inflection points of the center line axis of the work piece of FIG. 2.

In FIG. 6, 21 is, as an example, a start switch to be pressed by an operator at the time of starting the welding operation, and 22 is, as an example, a stop switch which detects the end of the welding operation through the position of head 5. Motors 15 and 17 are either activated or deactivated in accordance with the signals from these start and stop switches.

Once work piece W is mounted on stand 11, torch pipe 6 is inserted from the top inside work piece W and welding torch 9 is directed towards the starting point part (lowermost part) of the inner surface of work piece welding region W1.

Subsequently, welding is commenced and controller 3 works to rotate head 7 while raising head 5, such that the welding torch moves upwards in a spiral fashion.

Figure 4:
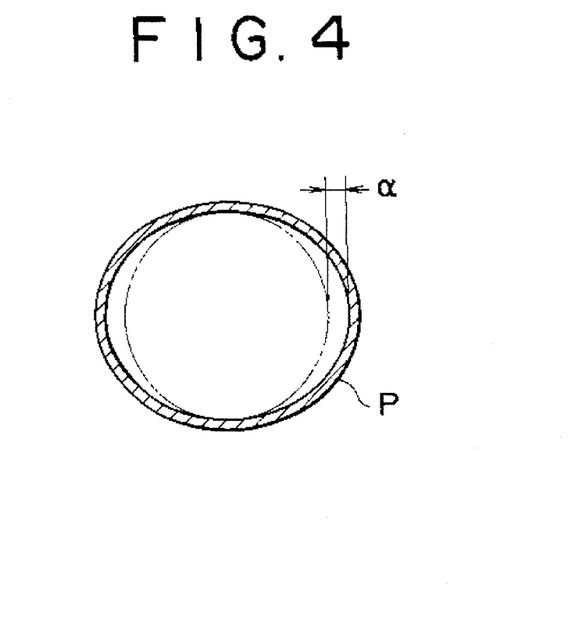
FIG. 4 is a diagram showing the cross-section taken through IV—IV shown in FIG. 3.

Each 360 degree turn of the path traced on the inner surface of the work piece by the welding torch is an approximately uniform ellipse of the kind shown in FIG. 4. Since the torch is controlled to move in the above described spiral fashion following the center axis of the work piece, the distance between the torch head and the inner surface of the work piece is approximately constant and thus there is no need for any complicated control in order to achieve an overlap layer of a high uniformity of thickness. Small discrepancies due to the difference a in length of the minor and major axes of the above described ellipses are compensated for by the use of an arc voltage control (AVC) unit.

In this way, as shown by the imaginary line in FIG. 2, a spiral shaped build-up layer is formed continuously on the inner surface of the work piece welding region W1.

Figure 7:
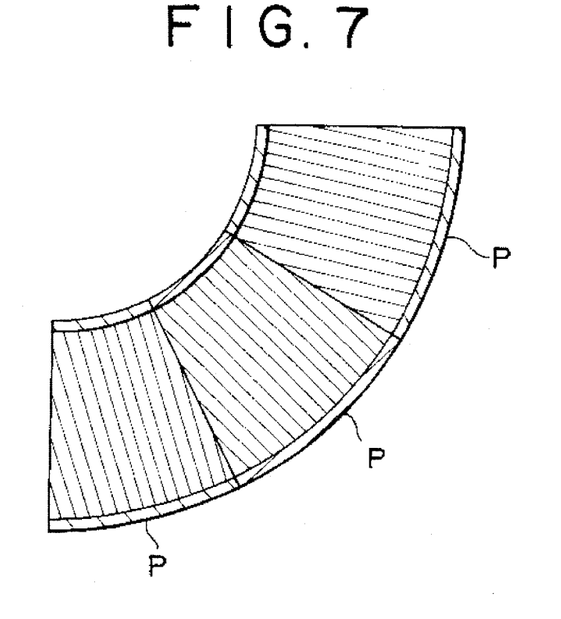
FIG. 7 is a cross-sectional view of the elbow pieces joined to form the elbow pipe.

After welding, the work piece W is removed from the stand 11 and the end tubes 10 are removed from the elbow piece stack Pu. Then each elbow piece is separated from each other and as shown in FIG. 7 the separate elbow pieces are then rewelded together such that the innermost and outermost arcs of each piece form a continuous line. Thus an elbow pipe having a build-up welded inner surface is reconstructed.

The presently preferred embodiment has been described in detail above. However the following variations are also considered as other embodiments of the present invention.

(1) In the above described embodiment, the welding torch 9 is moved in a spiral fashion to effect continuous welding. However, it is also possible to perform the welding by first rotating the welding torch 9 and then displacing the torch vertically pitch by pitch at the end of each complete rotation.

(2) When the division angle of the elbow pieces are small (less than 30°) the undulation of the work piece center axis is relatively small. Under these conditions, it is possible to do away with the profile means and simply displace the torch vertically along the longitudinal axis of the work piece. In this case, the AVC arc length control effect of the AVC unit is used to compensate for both discrepancies between the major and minor axes of the ellipse as mentioned above and also variations in distance between the torch head and inner surface of the work piece caused by changes in distance of the vertical axis X from the work piece center axis as the torch moves vertically.

(3) In the above described embodiment the work piece is fixed and the welding torch is displaced vertically. However, it is also possible to do the opposite and displace the work piece vertically while keeping the torch fixed, and/or rotating the work piece while keeping the torch fixed.

(4) In the above described embodiments, inner surface overlap welding of the entire surface area of the inner surface of the elbow piece stack in which the thickness of overlap is uniform all around the circumference is achieved by fixing end tubes 10 to each end of the elbow piece stack.

Figure 8:
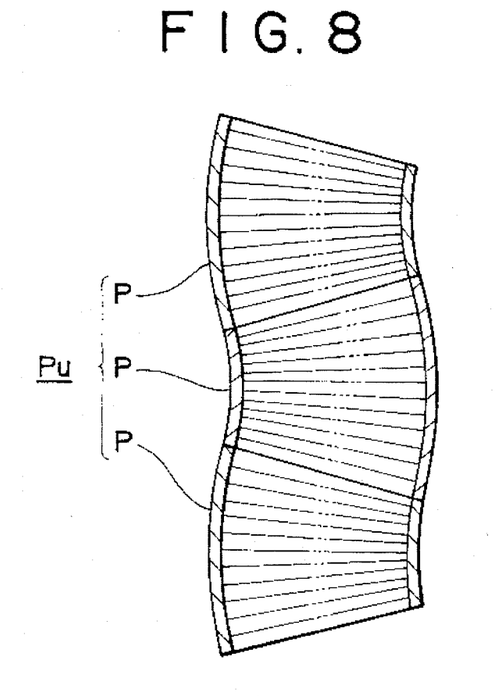
FIG. 8 is a cross-sectional view of the elbow piece block in the case when it is subject to inner surface overlap welding without the use of end tubes.

However, it is also possible to effect welding on the elbow piece stack as it is without fixing end tubes to it as shown in FIG. 8.

In this case, the control necessary to effect automatic welding of the entire surface area becomes complicated. It is suitable to effect the kind of "weaving" control disclosed in Japanese Patent Publication Sho 60-10832 in which the weaving breadth is increased from the inner circumference to the outer circumference.

However it is also possible to effect overlap welding of the majority of the inner surface using the method according to this invention and to then hand weld those parts at the extreme ends which were not welded in the automatic welding operation.

(5) It is also possible, in contrast to the vertical set-up of the above described embodiments, to support the elbow piece stack or work piece in a horizontal position.

The embodiments described above have all described cases in which the separate elbow pieces are stacked in a special way and the inner surface of the elbow piece stack is welded thus overlap welding the inner surface of all the elbow pieces at one time.

However it is also possible to apply the overlap welding method described above to the individual elbow pieces. Compared to the case where the elbow pieces are stacked together before welding the productivity is reduced. However even when applying this method to individual pieces, considering the fact that the quality of the finish is higher and that the entire surface area of each piece can be overlap welded automatically without the need for complicated control, this still represents a significant advance over the prior art methods.

Figure 9:
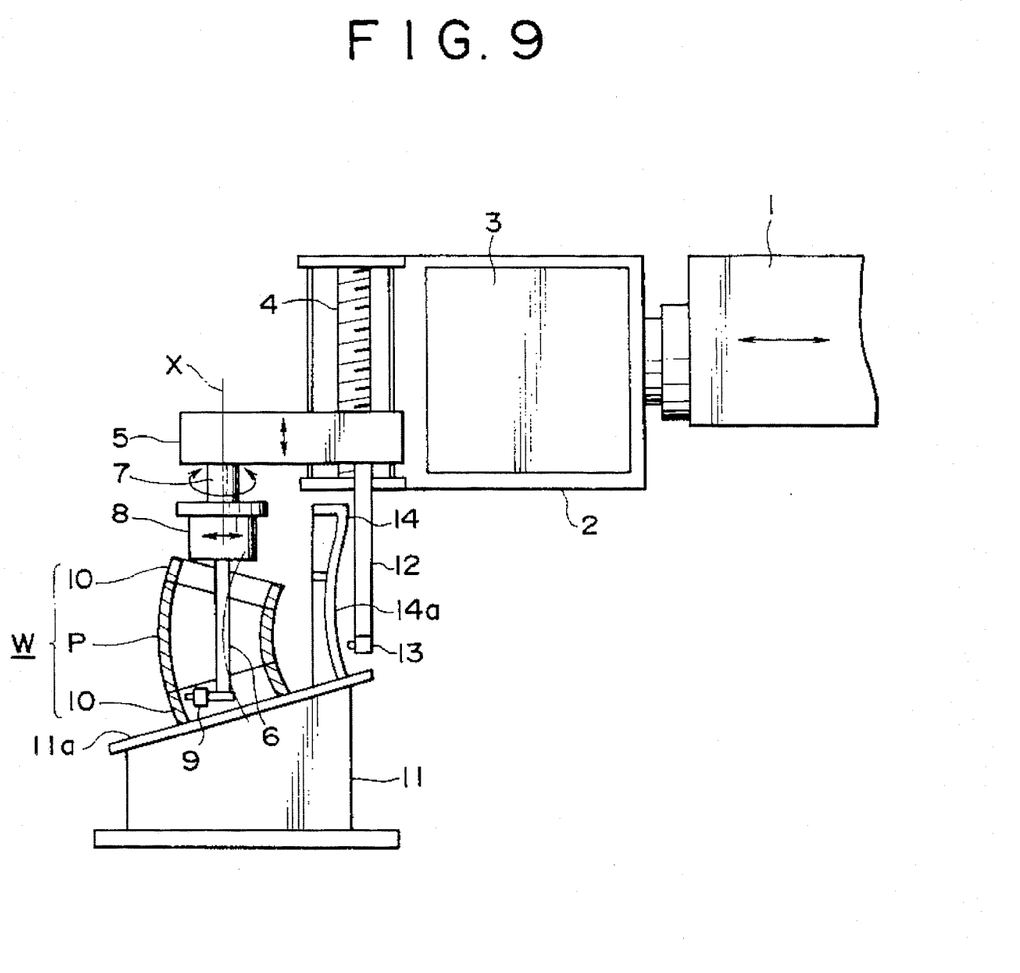
FIG. 9 is a schematic cross-sectional diagram of the welding device of a preferred embodiment of this invention for individually welding the inner surface of individual elbow pieces.
Figure 10:
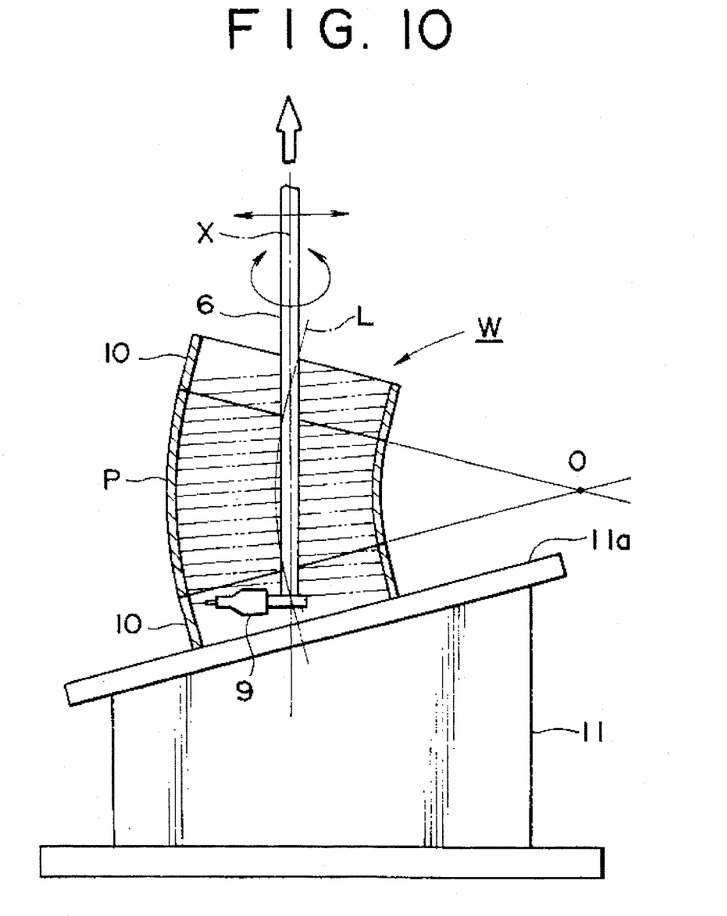
FIG. 10 is an enlarged view of the work piece and welding torch of FIG. 9.
Figure 11:
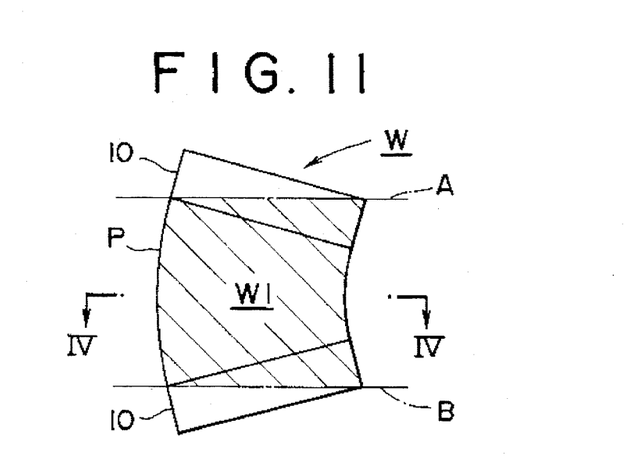
FIG. 11 is an enlarged cross-sectional diagram of the work piece of FIG. 9 to be subjected to inner surface overlap welding.

The apparatus as shown in FIG. 9 is identical to that shown in FIG. 1 except that the work piece is a single elbow piece with short straight end tubes fixed to the ends thereof. An enlarged view of the torch and work piece is shown in FIG. 10. As in the case where the elbow piece stack is welded, the object surface to be welded is shown by area W1 in cross-sectional FIG. 11 and comprises the entire surface area of the single elbow piece and part of the surface area of the two straight end tubes. The method of welding is exactly the same as that described for the elbow piece stack case and therefore a detailed discussion shall be omitted.

The possible variations earlier described for the case where the elbow pieces are stacked together and then overlap welded also apply for the case when single elbow pieces are overlap welded.

Although the present invention has been described in terms of the presently preferred embodiments and variations, it is to be understood that such disclosure is not to be interpreted as limiting. Various alterations and modifications will no doubt become apparent to those skilled in the art after reading the above disclosure. Accordingly, it is intended that the appended claims be interpreted as covering all alterations and modifications as falling within the true spirit and scope of this invention.

We claim:

1. A method of overlap welding an inner surface of an elbow pipe, the method comprising the steps of:

dividing said elbow pipe into a plurality of elbow pipe pieces;

stacking said plurality of elbow pipe pieces on top of each other such that an inner arc of any elbow pipe piece is continuous with an outer arc of a neighboring elbow pipe piece to form an elbow piece stack;

overlap welding an inner surface of said elbow piece stack;

dividing said welded elbow piece stack into its constituent elbow pipe pieces; and reassembling said elbow pipe from said elbow pipe pieces.

2. A method of overlap welding an inner surface of an elbow pipe, the method comprising the steps of:

dividing said elbow pipe into a plurality of elbow pipe pieces;

stacking said plurality of elbow pipe pieces on top of each other such that an inner arc of any elbow pipe piece is continuous with an outer arc of a neighboring elbow pipe piece to form an elbow piece stack;

fixing a straight end tube to each end of said elbow piece stack to form a work piece;

overlap welding an inner surface of said work piece;

dividing said welded work piece into its constituent elbow pipe pieces and straight end tubes; and reassembling said elbow pipe from said elbow pipe pieces.

3. A method of overlap welding the inner surface of an elbow pipe according to claim 2, wherein said step of overlap welding the inner surface of said work piece is performed by displacing a welding torch, mounted for rotation in a plane perpendicular to a longitudinal axis of said work piece and directed towards the inner surface of the work piece, to follow a center axis of said work piece and rotating said welding torch in a plane perpendicular to the longitudinal axis of said work piece.

4. A method of overlap welding the inner surface of an elbow pipe according to claim 2, wherein said step of overlap welding the inner surface of said work piece is preformed by displacing a welding torch, mounted for rotation in a plane perpendicular to a longitudinal axis of said work piece and directed towards the inner surface of said work piece, to follow the longitudinal axis of said work piece and rotating said torch about the longitudinal axis of the work piece.

5. A method of overlap welding the inner surface of an elbow pipe according to claim 2, further comprising the step of mounting said work piece at an angel $\theta$ to a horizontal, wherein $\theta$ is half an angle at which said elbow pipe is divided such that the work piece is supported vertically.

6. A method of overlap welding an inner surface of an elbow pipe piece, the method comprising the steps of:

fixing a straight end tube to each end of said elbow pipe piece to form a work piece having an object surface area to be welded which comprises the inner surface of the elbow pipe piece and a portion of a surface area of each of the straight end tubes, said object surface area to be welded being uniform about a circumference of the work piece;

overlap welding the object surface of said work piece; and removing said straight end tubes from said welded work piece.

7. A method of overlap welding the inner surface of an elbow pipe piece according to claim 6, wherein said welding is effected by displacing a welding torch, mounted for rotation in a plane perpendicular to a longitudinal axis of said work piece and directed towards the object surface of said work piece, to follow a center axis of said work piece and rotating said welding torch.

8. An apparatus for overlap welding an inner surface of a work piece made up of at least one elbow piece, the apparatus comprising:

support means for supporting said work piece;

a welding torch mounted for rotation in a plane perpendicular to a longitudinal axis of, and for displacement in a direction parallel to the longitudinal axis of, said work piece supported by said support means;

torch displacement means for displacing the welding torch in a direction parallel to the longitudinal axis of said work piece;

torch rotation means for rotating the welding torch in a plane perpendicular to the longitudinal axis of said work piece; and control means for controlling said torch rotating means and said displacement means;

wherein said welding torch is positioned on a torch pipe which is suspended from a head, and said welding torch is also mounted for displacement in a direction perpendicular to the longitudinal axis of said work piece, said apparatus further comprising:

copy means for baking the welding torch follow a center axis of said work piece, said copy means comprising:

a copy gauge having a surface parallel to the center axis of said work piece;

detection means for detecting a position of said copy gauge as said welding torch moves in a direction parallel to the longitudinal axis of said work piece, said detection means comprising a limit switch which is fixed to an arm that is suspended from said head; and second torch displacement means for displacing said welding torch in a direction perpendicular to the longitudinal axis of said work piece in accordance with signals from said detection means.

\* \* \* \* \*